United States Patent [19]

Trenkler et al.

[11] 4,283,714

[45] Aug. 11, 1981

[54] MAGNETIC KEYBOARD SYSTEM

[75] Inventors: George Trenkler, East Providence, R.I.; Richard G. Delagi, Sharon; Francois A. Padovani, Westwood, both of Mass.

[73] Assignee: Texas Instruments Incorporated, Dallas, Tex.

[21] Appl. No.: 64,954

[22] Filed: Aug. 8, 1979

[51] Int. Cl.³ .......... G06F 3/02

[52] U.S. Cl. .......... 340/365 L; 336/75; 336/188; 340/365 S

[58] Field of Search .......... 340/365 R, 365 L, 365 S, 340/195, 197, 199; 178/17 C, 19; 179/90 K; 336/73, 75, 77, 110, 188; 324/208; 400/479, 479.2; 200/67 F, 82 E, 81.9 M, 83 L; 307/112, 113, 115

[56] References Cited

U.S. PATENT DOCUMENTS

| | | | |
|---|---|---|---|
| 2,814,031 | 11/1957 | Davis | 340/365 L |
| 3,027,548 | 3/1962 | Vaughan | 340/365 L |
| 3,060,393 | 10/1962 | Sontheimer | 336/20 |
| 3,363,737 | 1/1968 | Wada et al. | 340/365 L |
| 3,495,236 | 2/1970 | Mathamel | 235/145 |
| 3,522,442 | 8/1970 | Wood | 340/365 L |
| 3,530,329 | 9/1970 | Corell et al. | 178/17 C |
| 3,564,214 | 2/1971 | Cooper | 340/149 A |
| 3,573,369 | 4/1971 | Konig et al. | 178/17 C |
| 3,598,903 | 8/1971 | Johnson et al. | 178/18 |
| 3,623,081 | 11/1971 | Scarbrough | 340/365 L |
| 3,626,409 | 12/1971 | Hill et al. | 340/365 L |
| 3,641,568 | 2/1972 | Brescia et al. | 340/365 L |
| 3,668,697 | 6/1972 | Cochran et al. | 340/365 L |
| 3,683,371 | 8/1972 | Holz | 340/365 L |
| 3,719,902 | 3/1973 | Esterly | 336/130 |
| 3,740,746 | 6/1973 | Dureau et al. | 340/365 L |
| 3,757,068 | 9/1973 | Musch et al. | 200/159 R |
| 3,911,429 | 10/1975 | Vinal | 340/365 L |
| 3,958,202 | 5/1976 | Sidor | 336/110 |
| 3,958,203 | 5/1976 | Bernin | 336/110 |
| 4,117,438 | 9/1978 | Kim et al. | 336/75 |
| 4,119,914 | 10/1978 | Duncan | 336/221 |
| 4,137,512 | 1/1979 | Sidor | 336/110 |

*Primary Examiner*—James J. Groody
*Attorney, Agent, or Firm*—James P. McAndrews; John A. Haug; Melvin Sharp

[57] ABSTRACT

A contactless travel keyboard has first and second coils with elongated loop portions arranged at each key station so that, when an electrically conductive key element at the station is in a key-up position spaced from the coils, electrical input to the first coil results in magnetic induction of a relatively small output signal of a first polarity in the second coil and so that, when the key element moves to a key-down position relatively closer to the coils, electrical input to the first coil induces a current in the key element to magnetically induce a control signal of opposite polarity in the second coil sufficient to reverse the polarity of the output from the second coil. The keyboard includes means responsive to the reversal in polarity of the output signals from the second coils for determining which keys are in a key-down position.

6 Claims, 5 Drawing Figures

MAGNETIC KEYBOARD SYSTEM

BACKGROUND OF THE INVENTION

The field of this invention is that of contactless travel keyboards for use in electronic business machines, data terminals and the like. The keyboards provide electrical control signals corresponding to the actuation of respective key switches on the keyboard.

Many conventional electronic equipments and devices use travel type keyboards in which substantial movement of a key is associated with the actuation of each key switch. That movement is considered desirable because it is believed to facilitate operator use of the keyboard and to provide more reliable input of data to the equipment. Such keyboards typically incorporate pairs of mating electrical contacts which are engaged and disengaged in response to key movement and, as will be understood, the designs of such keyboards usually represent conventional compromises between design factors such as cost, reliability and contact service life. Other keyboards of a contactless type, based on the use of capacitive switches or on the use of Hall effect devices or other magnetic means, have also been proposed for use in such electronic apparatus in attempting to achieve lower keyboard costs or improved keyboard reliability or the like. Usually however such contactless systems have tended to be more complex and have involved close matching of device component characteristics so that few of the objectives of improved cost or reliability have been achieved. With the growing interest in many new applications of data terminals for general consumer use, it would be desirable to provide a contactless type of travel keyboard characterized by improved low cost manufacture, by high reliability and by long service life.

It is an object of this invention to provide such a novel and improved contactless travel keyboard; to provide such a keyboard which incorporates inexpensive and easily manufactured components, which is easily assembled, and which is stable, rugged and reliable in use over a long service life; to provide such a keyboard which is reliable and cost effective for use in data terminals, computers, word-processing electronic equipment and the like in general consumer applications; to provide such a keyboard which is not subject to excessive wear; which is operable in hostile environments including high humidity, dust/dirt or beverage-spill conditions and the like, and which is energy efficient and operable at low cost; and to provide such a contactless keyboard which is substantially unaffected by extraneous electromagnetic fields, r.f. noise, or the proximity of other electrical equipment.

SUMMARY OF THE INVENTION

In the novel and improved contactless travel keyboard of this invention, a plurality of first wire coils or the like having elongated loop portions are mounted side-by-side on an insulating substrate or support means extending along the Y-axis of the support means. A plurality of second coils having elongated loop portions are mounted in side-by-side relation to each other extending along the X-axis of the support means. The second coils are each disposed in closely spaced, overlying relation to a plurality of the first coils so that corresponding loop portions of the first and second coils generally intersect at a plurality of locations or key stations on the support means. In that way, the key stations are arranged in a plurality of columns and rows on the support means in a selected keyboard pattern. Key means are mounted at each key station to carry respective electrically-conductive plate or ring elements or the like for movement between a first, key-up position spaced at a selected distance from the pair of intersecting coils at the key station and a second key-down position spaced relatively closer to the coils.

In accordance with this invention, the coil means at each key station are oriented and arranged relative to each other so that, when the conductive key element at the station is in its key-up position, electrical input to the first coil results in magnetic induction of a relatively small output signal of a first polarity in the second coil. That is, the elongated loop portions of the intersecting first and second coils have a selected angular orientation relative to each other for limiting the mutual inductance between the closely spaced coils, whereby there is sufficient coupling to provide an output of a selected first polarity from the second coil but where that output is of a generally limited amplitude.

On the other hand, the arrangement of the first and second coils at each key station is such that when the conductive key plate or ring is moved to its key-down position relatively closer to the intersecting coils at the station, electrical input to the first coil induces current in the conductive key element. That current magnetically induces a control signal in the second coil which is of opposite polarity and of sufficient amplitude to reverse the polarity of the output from the second coil. That is, movement of the conductive element places it close to the first coil where there sufficient mutual inductance with the elongated loop portions of the first coil to establish a flow of current in the element in a closed loop path in the element. Movement of the conductive element also places it close to the second coil where there is mutual inductance with the elongated loop portions of the second coil so that the closed loop current flowing in the conductive element induces a control signal in the second coil which is of opposite polarity and larger amplitude relative to the first signal established in the second coil.

In that way, the simple and inexpensive keyboard structure provided by this invention achieves reversal of the output signal polarity in the second coil at each key station when the key member of that station is moved between its key-up and key-down positions. In accordance with this invention, that keyboard structure is combined with any conventional electronic means such as microprocessor scanning means or the like to be responsive to reversal of the polarity of the outputs from the second coil means for determining which keys are in a key-down position.

Thus the novel and improved keyboard of this invention comprises simple and inexpensive coil means associated with simple, key-movable conductive rings or plates and with inexpensive and conventional electronic means for scanning the key stations on the keyboard. However the orientation and arrangement of the coil means and conductive key elements relative to each other is such that the keyboard provides a significant signal of a first polarity at each key station when the key at the station is in key-up position and is adapted to provide a clear reversal in the polarity of the signal at any selected key station when the key at that station is depressed. Accordingly the keyboard structure conveniently cooperates with inexpensive and conventional electronic means for detecting the depressed keys in a novel and improved manner.

DESCRIPTION OF THE DRAWING

Other objects, advantages and details of the novel and improved keyboard system of this invention appear in the following detailed description of preferred embodiments of the invention, the detailed description referring to the drawing in which.

DESCRIPTION OF THE PREFERRED EMBODIMENTS

Figure 1:
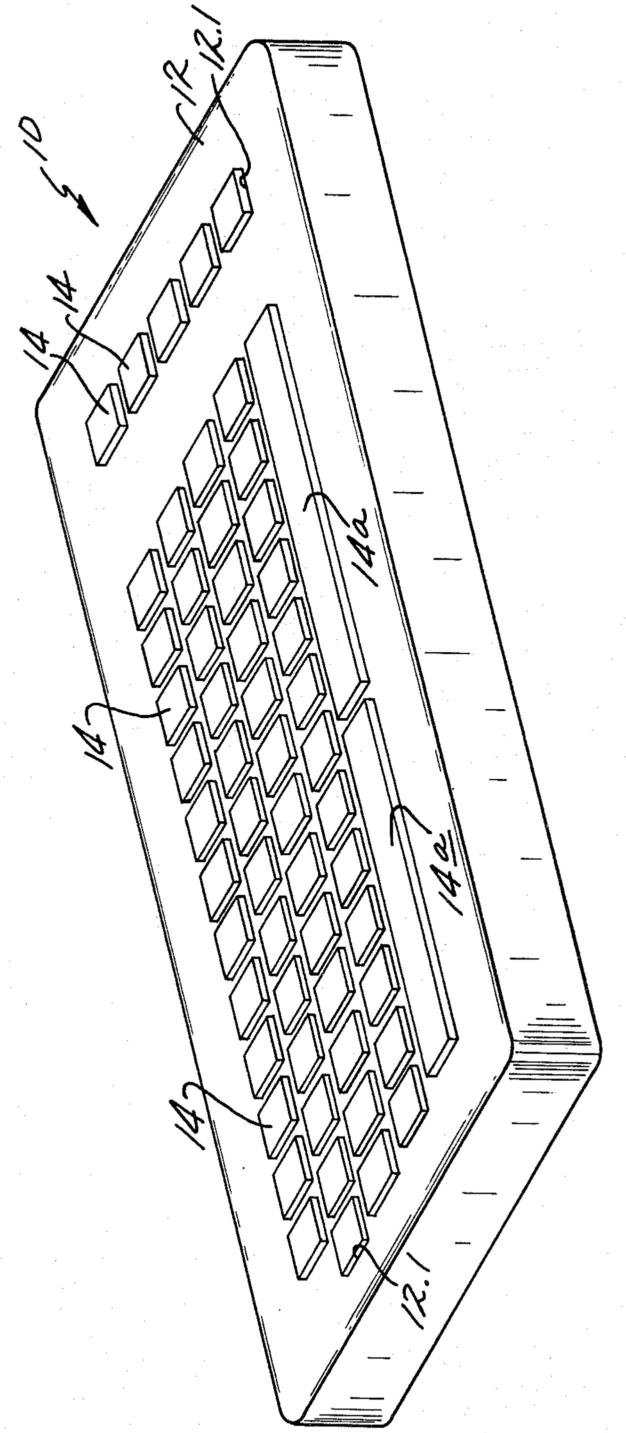
FIG. 1 is a perspective view of a keyboard apparatus provided by this invention.
Figure 3:
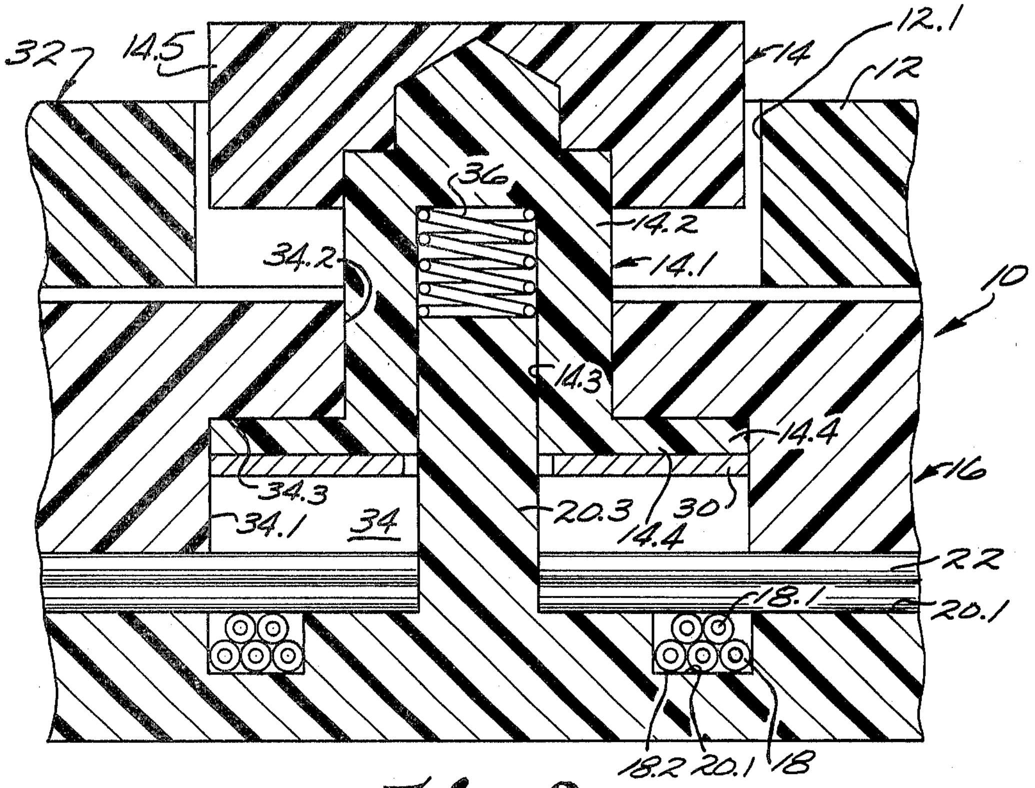
FIG. 3 is a section view to enlarged scale along line 3—3 of FIG. 1.

Referring to the drawings, 10 in FIGS. 1 and 3 indicates the novel and improved keyboard of this invention which is shown to comprise an escutcheon of housing member 12 having openings 12.1 through which pushbutton keys 14 are made accessible to a keyboard operator in conventional manner. In a preferred embodiment of the keyboard 10 as illustrated in FIG. 1, the keyboard has a large number of keys such as are conventionally used in an alphanumeric keyboard provided in a data entry terminal or the like, the keys being arranged in horizontally extending rows and vertically extending columns in conventional manner. Typically for example, the keys are arranged in four rows of 12 to 14 keys each and a fifth row has one or two keys 14*a* proportioned to serve as space bars or the like. The row keys are also arranged in a plurality of 4 to 5 key columns, which columns are angled somewhat toward the right hand end of the keyboard at the bottom of the columns as in most conventional keyboards. The escutcheon or housing member 12 encloses a main keyboard assembly 16 which is secured to the housing in any conventional manner (not shown) so that the main assembly is supported on the housing and so that the keys 14 which are carried by the assembly extend up through the housing openings 12.1 as will be understood.

Figure 2:
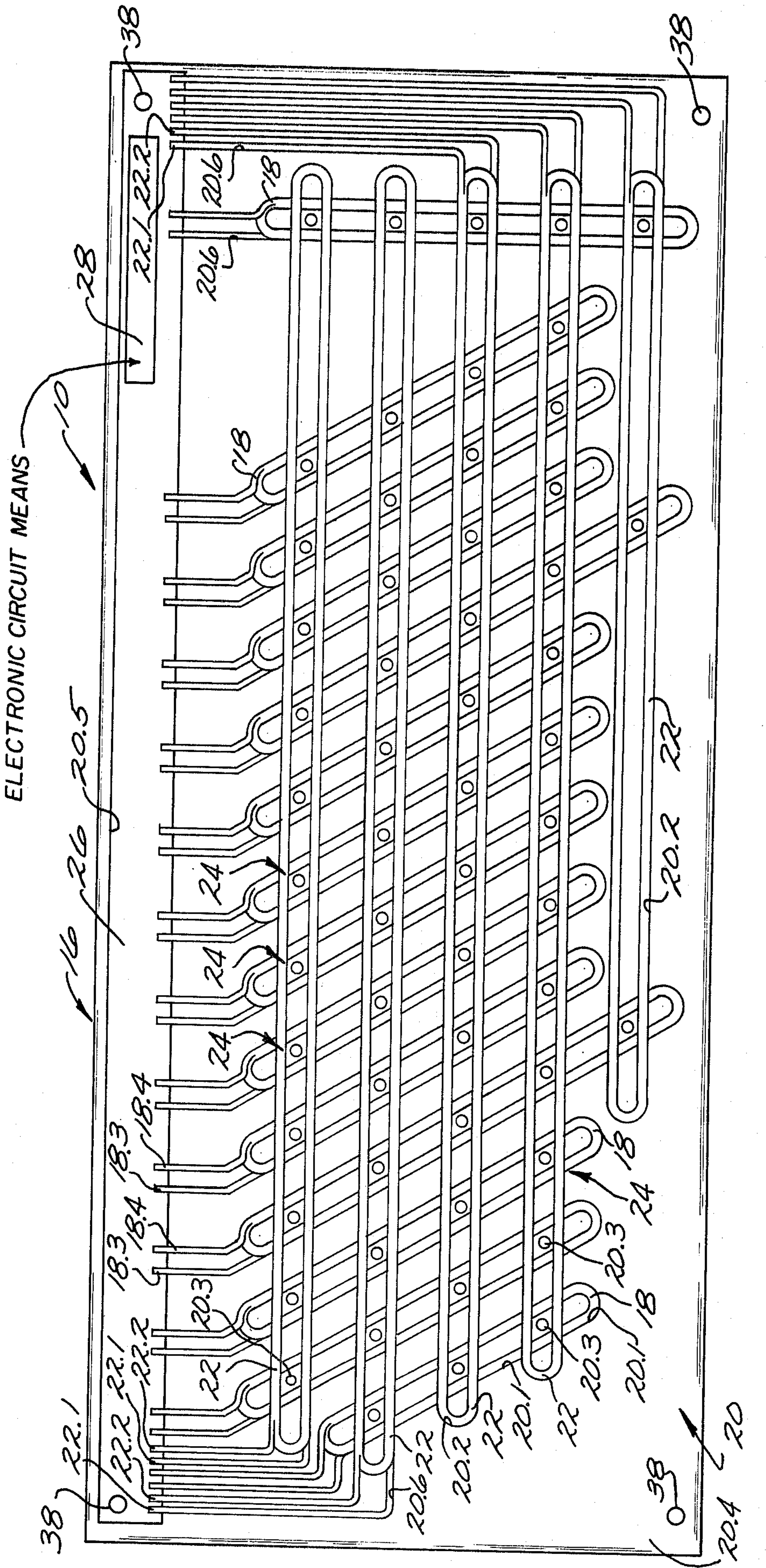
FIG. 2 is a plan view of the apparatus of FIG. 1 with its keys and key retainer means removed.

In accordance with this invention, the main keyboard assembly 16 includes a plurality of first wire coils 18 or the like having elongated loop portions which are mounted in side-by-side, generally parallel relation to each other and to the Y-axis of an insulating substrate or support means 20 spaced from each other along the X-axis of the substrate as shown in FIGS. 2 and 3. A plurality of second wire coils 22 also having elongated loop portions are also mounted in side-by-side, generally parallel relation to each other and to the X-axis of the substrate 20 spaced from each other along the X-axis of the substrate. The second coils 22 are each disposed in closely spaced, overlying relation to a plurality of the first coils so that corresponding loop portions of the first and second coils generally intersect at a plurality of locations or key stations 24 on the support means 20.

In a preferred embodiment of this invention, for example, the insulating substrate 20 is molded of a strong and relatively rigid electrical insulating material such as polypropylene or the like in the form of a coil tray or the like as illustrated in FIGS. 2 and 3. That is, the tray is provided with a plurality of relatively deep, groove-like recesses 20.1 extending in side-by-side relation to each other generally parallel to but slightly inclined relative to the Y-axis of the tray as shown in FIG. 2. The tray also has a plurality of relatively less deep, groove-like recesses 20.2 extending in side-by-side relation generally parallel to the X-axis of the support 20 so that the recesses 20.2 intersect the recesses 20.1 at the keys stations 24. In the preferred embodiment of the invention, the tray or support 20 has respective key guide shafts or posts 20.3 upstanding from the support at each key station 24 and preferably those guide posts extend up above the top surface 20.4 of the tray. Preferably the tray also has a larger recess 20.5 molded therein for receiving a printed circuit board 26 of generally conventional type which is nested in the recess to be located in a selected position on the tray by the recess.

Each of the first wire coils 18 preferably comprises 6 to 12 turns of #30 Gage copper magnet wire 18.1 or the like having an insulating coating 18.2 thereon. The coils are preferably wound with elongated loop portions of a length on the order of about 2 to 4 inches and with a coil width of 0.25 to 0.50 inches or the like. The coils are then nested in respective recesses 20.1 in the coil tray as shown in FIGS. 2 and 3 so that the opposite ends 18.3, 18.4 of the coil extend to the printed circuit board 26 as shown in FIG. 2. The second coils 22 are preferably formed of a similar width with similar wire materials but typically have relatively longer elongated loop portions on the order of about 9 inches or so. The second coils 22 are disposed in tray grooves 20.2 so that each of the coils 22 extends in closely spaced, overlying and generally intersecting relation to a plurality of the first coils 18 and so that the opposite ends 22.1, 22.2 of the coils also extend to the p.c. board 26 as shown in FIG. 2. As will be understood, such coils are easily and inexpensively wound to any desired length and width with lead ends of any desired length using conventional coil winding equipment and are easily positioned in the coil tray as shown. The coil tray is easily molded and, if desired, the coil tray is provided with additional narrow and shallow grooves or recesses 20.6 for receiving and guiding the coil ends 18.3, 18.4 and 22.1, 22.2 to the circuit board as will be understood. The ends of the coils are preferably soldered or otherwise secured to selected conductive circuit paths (not shown) which are provided on the circuit board in conventional manner for electrically connecting the coils 18 and 22 to electronic means diagrammatically indicated at 28 in FIG. 2 as will be further discussed below.

In accordance with this invention, the pushbutton keys 14 are mounted in the assembly 16 at the respective key stations 24 so that each key mounts an electrically conductive key element of plate or ring shape for movement between a key-up position spaced substantially from the coils 18 and 22 which intersect at the key station and a key-down position where the conductive element is spaced relatively closer to the coils at that station. In a preferred embodiment of this invention as shown in FIG. 3 for example, each key 14 preferably has a base portion 14.1 having a stem part 14.2 with a central recess 14.3 and having a flange part 14.4 mounting a conductive ring 30 of copper or the like on the face of the flange. Preferably the key stem 14.2 is adapted to receive a key cap 14.5 which is press fitted or otherwise detachably secured to the stem as shown in FIG. 3. The key base part and/or the key cap are preferably formed of polypropylene or other relatively strong and rigid electrical insulating material and if desired, the conductive ring element 30 is plated onto the key flange or is cemented or secured to flange in other conventional manner.

In the preferred embodiment of this invention, the key assembly 16 further includes a generally flat key retainer plate member 32 having a plurality of openings 34 which are adapted to fit over the respective key guide posts 20.3 on the coil tray, each opening having a large diameter portion 34.1 and a small diameter portion 34.2 forming a shoulder 34.3 therebetween. In making the key assembly 16, the key stem parts 14.2 are inserted into the respective openings 34 in the key retainer plate so that the key flange 14.4 is disposed against the retainer shoulder 34.3. The key caps 14.5 are then secured to the respective key stems. Helical coil compression springs 36 or the like are then placed in the key stem recesses 14.3 and the recesses are loose-fitted or otherwise disposed over the key guide posts 20.3 on the coil tray. Preferably the retainer member is secured to the coil tray by means of screws 38 as indicated at 38 in FIG. 3 for holding the coils 18 and 22 and the p.c. board 26 in place therebetween. In that arrangement, the keys 14 are individually movable and movement of each key at a key station 24 moves the conductive plate or ring 30 between the key-up and key-down positions noted above.

In accordance with this invention, the coil means 18 and 22 as above described are arranged, oriented and proportioned relative to each other in a simple and convenient manner at each key station so that the coils cooperate with each other and with the conductive key element 30 at the key station for providing output signals from the sensing coils 22 which reflect whether the various individual keys 14 on the keyboard are in key-up or keydown positions. That is elongated loop portions of the coils intersecting at the respective key stations are oriented at, or nearly at, right angles to each other in the vicinity of the respective key stations as is diagrammatically illustrated at stations 24*a* and 24*b* in FIG. 4. The end portions 18.5, 18.6 and 22.3, 22.4 of the intersecting coil loops, which have other dispositions relative to each other and to the elongated loop portions of the coils, are spaced at least at a selected distance from those key stations. In that arrangement, when an electrical input pulse is applied to the driving or exciting coil 18 at a key station 24*a* as is indicated by the arrows 40 in FIG. 4 while the key element 30 at that station is in its key -up position spaced away from the coils, there is a selected limited degree of direct mutual inductance between the intersecting coils 18 and 22 and that direct mutual inductance provides an output or control signal of relatively small amplitude and of a selected first polarity in the sensing coil 22 as indicated by the arrows 42 at key station 24*a* in FIG. 4. That is, a large part of the magnetic flux which is established in the field around coil 18 as the pulse 40 is applied to coil 18 does not tend to cut the adjacent elongated loop portions of the intersecting coil 22 but there is still sufficient mutual inductance between the coils attributable either to the effect of the ends of the coil loops, to the slightly oblique nature of the angular orientation between the intersecting coils, or to local field distortions or the like to assure that an output signal 42 of at least a small but significant amplitude and of selected first polarity is magnetically induced in the sensing coil 22.

Figure 4:
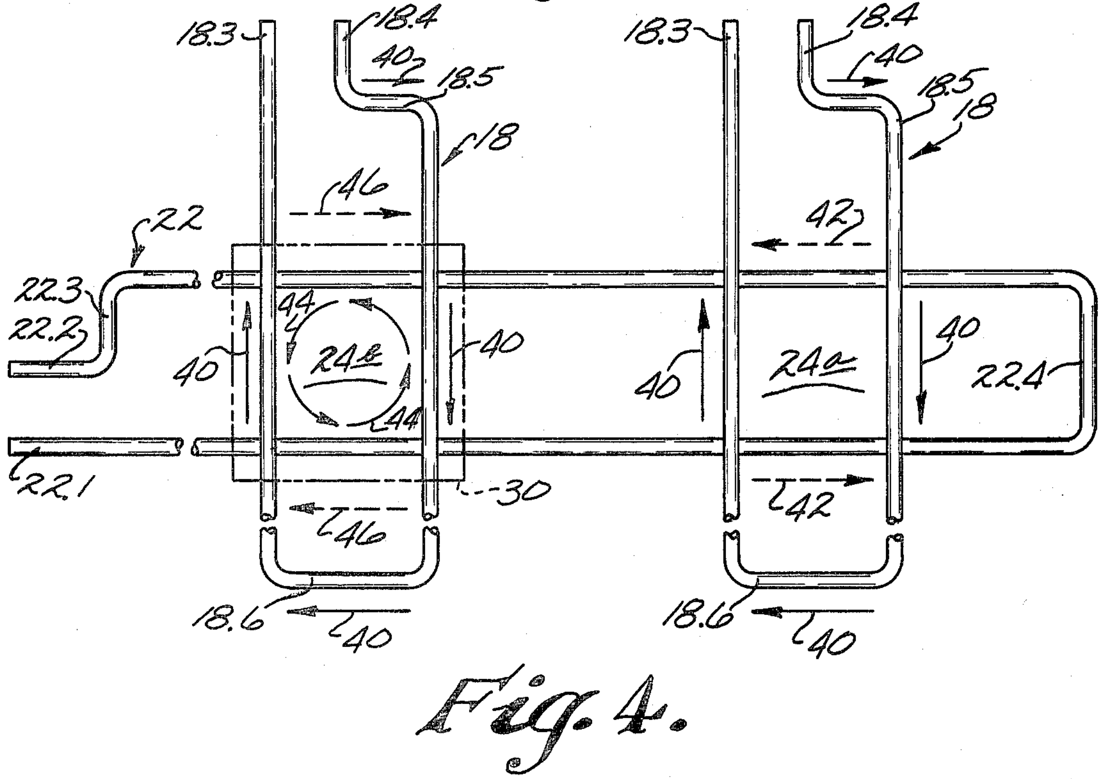
FIG. 4 is an enlarged diagrammatic view of a key station in the keyboard of this invention.

On the other hand, when the pushbutton 14 at a key station is moved to its key-down position, the conductive key ring or element 30 carried by the key is moved into close mutual inductance with each of the coils 18 and 22 which intersect at that station as is diagrammatically illustrated at key station 24*b* in FIG. 4. As a result, when an input pulse 40 is applied to the driver coil 18 while the key is down, the polarity of the output signal induced in the sensing coil 22 is reversed as is indicated by the arrows 46 at key station 24*b* in FIG. 4. That is, the configuration of the conductive ring or element 30 relative to the coils 18 and 20 is such that as it is moved closer to the coils, it cuts into and substantially intercepts the magnetic field which is established as the input pulse 40 is applied to the coil 18. Accordingly, a substantial current 44 is induced in and flows in a closed loop parth in the conductive element 30 as is indicated by the arrows 44 at station 24*b* in FIG. 4; and the magnetic field established by the current 44 in the conductive key element induces a second control or output signal in the sensing coil, that second control signal being of an opposite polarity and of sufficient amplitude for reversing the polarity of the output provided by the sensing coil 22 as is indicated by the direction of the arrows 46 in FIG. 4.

In a typical embodiment of this invention, for example, where an input pulse 40 of about 2.00 volts is applied to the driving coil 18 with a duration of 2 microseconds, an output pulse 42 of about 10 millivolts and of a selected first polarity is provided in the sensing coil 22 at a key station when the conductive element 30 at that key station is in its key-up position. However, when the same input pulse is applied to the coil 18 while the key at the station is depressed, the sensing coil 22 provides an output of about 10 millivolts with a reversed polarity. As will be understood, the proportions, orientation and spacing of the coils 18 and 22 are selected relative to the amplitude of the driver pulses to be applied to the coils 18 and relative to various other design features as suggested above so that the keyboard structure as above described is adapted to provide output signals at the desired levels and with the desired reversal of polarity reflecting the positions of the various keys in the structure.

In accordance with this invention, the keyboard structure as above-described is combined with any conventional electronic means (diagrammatically indicated at 28 in FIG. 2) for applying driving inputs to the exciting coils 18 at the respective key stations and for responding to the reversal in polarity in output from the sensing coils 22 at key stations where keys are depressed for performing selected control functions in a manner reflecting the up or down positions of the various keys. Typically for example, conventional electronic scanning means apply electrical pulses to the coils 18 in rapid sequence with one pulse being applied to each of the coils 18 for each key station intersected by the coil, whereby the driving pulses are sequentially applied to the driving coils 18 at the respective key stations 24 in conventional manner. Corresponding electronic scanning means address the sensing coils 22 at the key stations as the respective drive coils are pulsed, the addressing means being adapted to respond to perform selected control funcions when output signals of said reversed polarity are received from key stations where keys 14 have been depressed.

Figure 5:
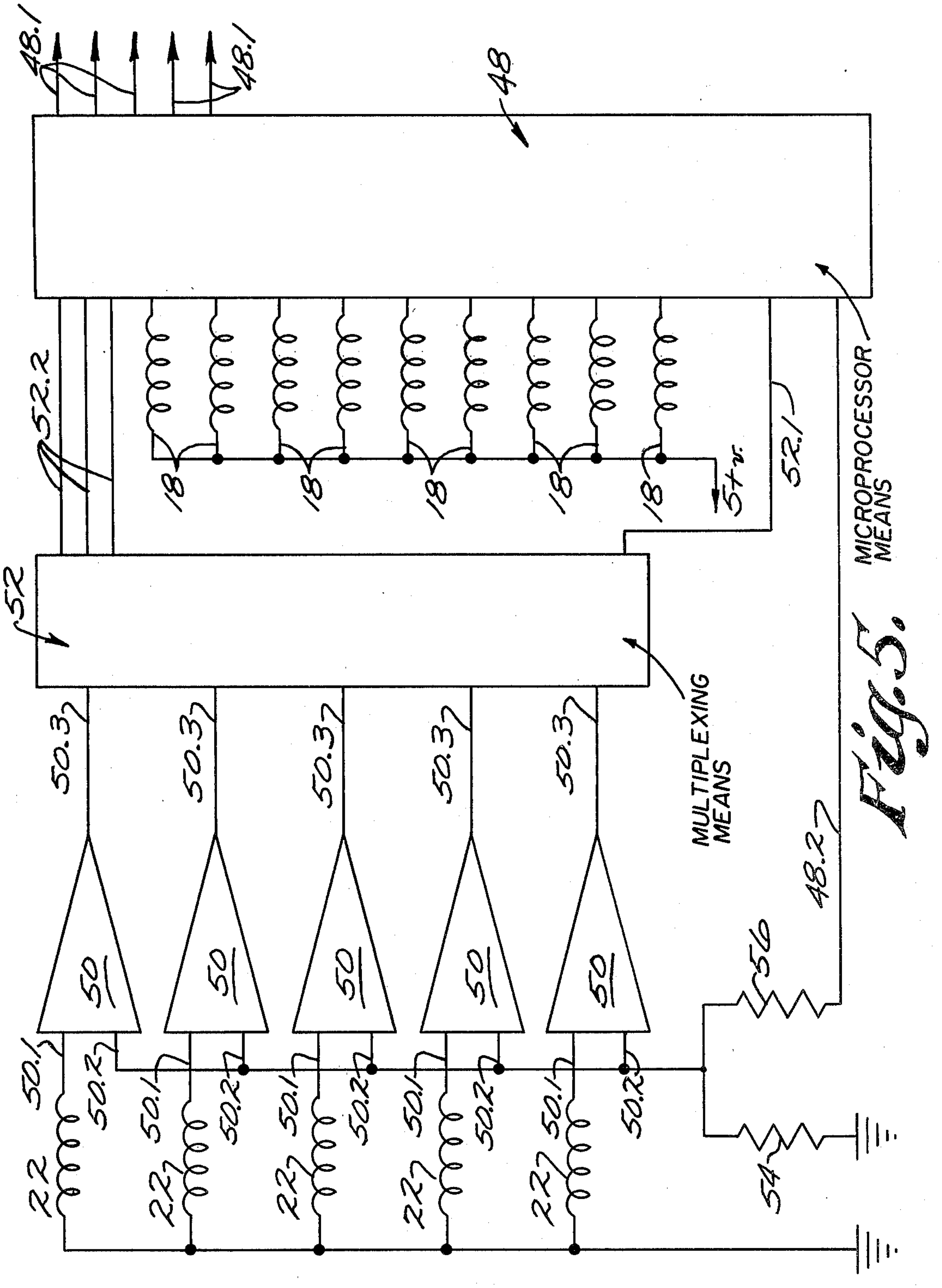
FIG. 5 is a schematic view of the keyboard system of this invention.

In a preferred embodiment of this invention as is schematically illustrated in FIG. 5 for example, the exciting coils 18 are connected to a power source through microprocessor means 48 or the like operated in a conventional manner for scanning the coils in a predetermined sequence to apply electrical input pulses to the coils 18 at the respective key stations in sequence in conventional manner. The sensing coils 22 are connected between ground and selected poles 50.1 of respective amplifier means 50 while the other input poles 50.2 of the amplifiers are connected to ground, whereby only output pulses 46 from the coils 22 which are of said reversed polarity to reflect keys in down positions are amplired and provided as outputs from the amplifiers at 50.3. Conventional multiplexing means 52 are driven from the microprocessor 48 as indicated at 52.1 and are connected to the amplifiers 50 in a conventional manner so that the sensing coils 22 are addressed in sequence at the respective key stations 24 as the drive coils 18 at the stations are pulsed. Output signals of said reversed polarity which are derived by the multiplexing means from key stations where keys are depressed are fed to the microprocessor as indicated at 52.2 to be processed in any conventional manner for providing control signal outputs as indicated at 48.1 reflecting the operation of the keyboard structure as will be understood.

Preferably for example, the microprocessor means 48, the amplifiers 50 and the multiplexing means 52 are embodied in integrated circuit means or the like mounted on the p.c. board 26 as indicated at 28 in FIG. 2 and the coils 18 and 22 are electrically connected to the described electronic components by circuit paths (not shown) on the board in conventional manner. If desired, the poles 50.2 of the amplifiers are grounded through resistor 54 for establishing a selected reference voltage level for actuation of a key and the microprocessor means 48 is adapted to apply a relatively lower level bias through resistor 56 when a key is first actuated, whereby, when the key is maintained in actuated condition, chattering or intermittent interruption of the key actuation signal is less likely to occur. As electronic means for scanning or addressing key stations 24 or the like are well known, the electronic means 28 utilized with the keyboard structure of this invention is not otherwise described herein and it will be understood that the electronic means are adapted to respond to reversal in the polarity of the outputs from the reversing coils 22 for performing control functions corresponding to the depressed keys.

It should also be understood that although particular embodiments of the keyboard of this invention have been described above by way of illustration, the invention includes all modifications and equivalents of the disclosed embodiments falling within the scope of the appended claims.

We claim:

1. A control apparatus comprising first magnetic means, means for applying an input signal to the first magnetic means, second magnetic means mounted adjacent to the first magnetic means, and modifying means movable between a first position in which the second magnetic means provides an output signal of a first polarity in response to the input of a signal to the first magnetic means and a second position in which the second magnetic means provides an output signal of an opposite polarity in response to the input of a signal to the first magnetic means, characterized in that, the second magnetic means is arranged relative to the first magnetic means so that said output signal of said first polarity is induced with relatively small amplitude in and provided as an output from the second magnetic means in response to the input of a signal to the first magnetic means when the modifying means is in said first position, said modifying means being also adapted to have a signal induced therein in response to the input of a signal in the first magnetic means when the modifying means is in said second position so that the signal in the modifying means tends to induce a corresponding signal in the second magnetic means which is of larger amplitude and of opposite polarity relative to said output signal of said first polarity, whereby the polarity of the output provided by the second magnetic means is reversed to provide said opposite polarity output signal from the second magnetic means when the modifying means is in said second position.

2. A keyboard switch comprising first coil means, means for applying an electrical input signal to the first coil means, second coil means mounted adjacent to the first coil means, and electrically conductive key means movable between a first position in which the second coil means provides an output signal of a first polarity in response to the input of the electrical signal to the first coil means and a second position in which the second coil means provides an output signal of an opposite polarity in response to the input of the electrical signal to the first coil means, characterized in that, the second coil means is arranged relative to the first coil means so that said output signal of said first polarity in induced with relatively small amplitude in and provided as an output from the second coil means in response to the input of the electrical signal to the first coil means when the electrically conductive key means is in said first position, said electrically conductive means being also adapted to have an electrical signal induced therein in response to the input of the electrical signal to the first coil means when the key means is in said second position for tending to induce a corresponding signal in the second coil means which is of larger amplitude and opposite polarity relative to said output signal of said first polarity for reversing the polarity of the control signal output provided by the second coil means to provide said opposite polarity output signal from the second coil means when the key means is in said second position.

3. A keyboard switch comprising first coil means having elongated loop portions, means for applying electrical input to the first coil means, second coil means having elongated loop portions mounted adjacent to the first coil means in an overlying, generally intersecting relation to the first coil means for forming a key station at the intersection between the coil means, and electrically conductive key means movable at the key station between a first position spaced at a selected distance from the intersection of the coil means and a second position spaced relatively closer to the intersection of the coil means, said second coil means being oriented and arranged relative to the first coil means so that a first relatively small amplitude control signal of a first polarity is magnetically induced in and provided as an output from the second coil means in response to said electrical input to the first coil means when the key means is in said first position, and so that an electrical signal is also induced in the key means in response to said electrical input to the first coil means when the key means is in said second position for tending to magnetically induce a corresponding signal in the second coil means which is of larger amplitude and opposite polarity relative to said first control signal for reversing the polarity of the control signal output provided by the second coil means when the key means is in said second position.

4. A keyboard system comprising a plurality of first coil means having elongated loop portions, means for applying electrical input to the first coil means, a plurality of second coil means having elongated loop portions mounted adjacent to the first coil means in overlying, generally intersecting relation to the first coil means for forming a key station at the intersection of each first coil means with each second coil means, and respective electrically conductive key means movable at each key station between a first position spaced at a selected distance from the coil means intersecting at the key station and a second position spaced relatively closer to the coil means intersecting at the key station, said second coil means being oriented and arranged relative to said first coil means at each key station so that a first relatively small amplitude control signal of a first polarity is magnetically induced in and provided as an output from said second coil means in response to electrical input to said first coil means when the key means at said key station is in the first position thereof, and so that an electrical signal is also induced in said key means in response to electrical input to said first coil means when said key means is in the second position thereof for tending to magnetically induce a a corresponding signal in the second coil means which is of larger amplitude and opposite polarity relative to said first control signal for reversing the polarity of the control signal output provided by said second coil means when said key means is in said second position.

5. A keyboard switch comprising support means, first coil means mounted on the support means, means providing an input signal to the first coil means, second coil means mounted on the support means adjacent to the first coil means, an electrically conductive key means movable on the support means between a key-up position having a selected spacing from said coil means and a key-down position spaced relatively closer to each of said coil means, said second coil means being arranged relative to the first coil means to permit a first relatively small amplitude control signal of a first polarity to be induced in the second coil means in response to the input signal in the first coil means when the key means is in said key-up position, said key means being also adapted to have a signal induced therein in response to the input signal in the first coil means when the key means is in said key-down position for tending to induce a corresponding, relatively larger amplitude control signal of opposite polarity in the second coil means to reverse the polarity of the output signal provided by the second coil means, and means for detecting the reversal in polarity of said output signal from the second coil means to indicate the key-down position of the key means.

6. A keyboard switch system comprising support means, a plurality of first coils having elongated loop portions mounted on the support means, means providing electrical input to the first coils, second coils having elongated loop portions mounted on the support means in overlying, generally intersecting relation to the elongated loop portions of the first coils for forming key stations at intersections of loop portions of each first coil with loop portions of each second coil, respective electrically conductive key elements movable on the support means at each key station between a key-up position having a selected spacing from the coil loop portions intersecting at the station and a key-down position spaced relatively closer to the coil loop portions intersecting at that station, said second coils having their elongated loop portions oriented and arranged at each key station relative to the elongated loop portions of the first coil at that station to permit a first relatively small amplitude control signal of a first polarity to be magnetically induced in the second coil at that key station in response to electrical input to the first coil intersecting at that station when the key element at said station is in its key-up position; said key elements at each key station being also adapted to have an electrical signal induced therein in response to electrical input to the first coil intersecting at that station when the key element is in its key-down position for tending to magnetically induce a corresponding, relatively larger amplitude control signal of opposite polarity in the second coil intersecting at that station to reverse the polarity of the output signal provided by the second coil at that station, and means for detecting the reversal in polarity of output signals from said second coils at selected stations to indicate the key-down positions of key elements at said stations.

* * * * *